United States Patent [19]
Zehnpfennig et al.

[11] Patent Number: 5,406,412
[45] Date of Patent: Apr. 11, 1995

[54] HIGH-RESOLUTION SYNTHETIC APERTURE ADAPTIVE OPTICS SYSTEM

[75] Inventors: Theodore F. Zehnpfennig, Wayland; Saul A. Rappaport, Burlington, both of Mass.

[73] Assignee: Visidyne, Inc., Burlington, Mass.

[21] Appl. No.: 103,272

[22] Filed: Aug. 6, 1993

Related U.S. Application Data

[63] Continuation-in-part of Ser. No. 79,087, Jun. 17, 1993, Pat. No. 5,365,367.

[51] Int. Cl.$^6$ ............................................. G02B 27/00
[52] U.S. Cl. ................................. 359/399; 359/213; 359/364; 359/433; 359/559
[58] Field of Search ............... 359/399, 213, 364, 365, 359/366, 433, 559, 560, 561

[56] References Cited

U.S. PATENT DOCUMENTS

| | | | |
|---|---|---|---|
| 3,556,630 | 1/1971 | Wilczynski | 359/9 |
| 4,039,246 | 8/1977 | Voigt | 359/220 |
| 4,836,666 | 6/1989 | Meinel et al. | 359/366 |
| 5,291,333 | 3/1994 | Mills et al. | 359/399 |

FOREIGN PATENT DOCUMENTS

| | | | |
|---|---|---|---|
| 2615002 | 11/1988 | France | 359/399 |
| 0888051 | 12/1981 | U.S.S.R. | 359/399 |

*Primary Examiner*—Joseph A. Popek
*Assistant Examiner*—Tan Nguyen
*Attorney, Agent, or Firm*—Iandiorio & Teska

[57] ABSTRACT

A high-resolution synthetic aperture, adaptive optics system includes an imaging system having a plurality of optical elements including at least a primary mirror which is a section of the aperture to be synthesized, and a detector for receiving the radiation collected by the primary mirror; and a device for rotating the primary mirror section through a number of angular positions about the aperture being synthesized to obtain a plurality of component images of an object, at least one from each of the positions; a device for sensing distortion of an incident wavefront; and a device responsive to distortions of the wavefront for locally adjusting at least one of the optical elements to correct distortions in the wavefront.

13 Claims, 7 Drawing Sheets

HIGH-RESOLUTION SYNTHETIC APERTURE ADAPTIVE OPTICS SYSTEM

RELATED CASE

This application is a Continuation-in-Part of U.S. patent application Ser. No. 08/079,087, filed Jun. 17, 1993, entitled "High Resolution Synthetic Aperture Telescope System", by the same inventors, Theodore F. Zenhpfennig and Saul A. Rappaport, now U.S. Pat. No. 5,365,3671.

FIELD OF INVENTION

This invention relates to a high-resolution synthetic aperture adaptive optics system.

BACKGROUND OF INVENTION

In large aperture optical systems such as astronomical telescopes, wavefront distortion is a serious problem which places limits on the angular resolution which can be achieved. The wavefront distortion can occur from deformation of the mirror elements due to mechanical and thermal stresses and/or deformation of the incident wavefront caused by turbulence in the atmosphere. Indeed, because of the latter effect, no large ground-based astronomical telescope presently in existence can achieve anywhere near diffraction-limited performance. One approach to overcome such distortions is to use adaptive optics: that is, a multiplicity of electromechanical actuators are positioned on the primary or secondary mirror to locally reposition the surface of the mirror to correct for wavefront distortion due to mirror deformation or atmospheric turbulence. However, this is a complex and expensive solution. For example, a forty-eight inch diameter mirror having local adjustable regions three inches on a side would require approximately 200 actuators, with all the attendant electronics and controls. Three inches is about the size of the typical atmospheric disturbance cell. While this approach often makes economic sense for very large systems where a segmented structure comprising many small mirror segments each independently adjustable is less expensive than one large monolithic mirror, it is not so with respect to smaller systems. Yet smaller systems, while not so susceptible to mechanical and thermally induced wavefront distortion, nevertheless suffer from wavefront distortion due to atmospheric perturbations that deform the incident wavefront and limit the resolution of ground-based systems.

SUMMARY OF INVENTION

It is therefore an object of this invention to provide an improved high resolution, synthetic aperture, adaptive optics system.

It is a further object of this invention to provide such an improved high resolution, synthetic aperture, adaptive optics system which corrects for image degradation due to mirror and/or atmospheric wavefront distortion.

It is a further object of this invention to provide such an improved high resolution, synthetic aperture, adaptive optics system which requires far fewer mirror segments, actuators, controls, measurement systems, and drive systems to correct for distortion.

It is a further object of this invention to provide such an improved high resolution, synthetic aperture, adaptive optics system which has the angular resolution of a large aperture system using smaller and fewer components.

It is a further object of this invention to provide such an improved high resolution, synthetic aperture, adaptive optics system which is more reliable because it has fewer actuators and components.

The invention results from the realization that an economical high resolution optical system can be achieved by rotating a chordal section of a mirror to synthesize the aperture of the full mirror while, at the same time, locally adjusting the primary mirror, secondary mirror or some other optical element in the system to correct for distortions in the incident wavefront. The rotating section of the primary mirror simulates the angular resolution of the full circular mirror, while reducing the complexity of adaptive optics sub-systems by greatly decreasing the mirror surface area which must be adaptively corrected.

This invention features a high-resolution synthetic aperture adaptive optics system which includes an imaging system having a plurality of optical elements including at least a primary mirror which is a section of the aperture to be synthesized and a detector for receiving the radiation collected by the primary mirror. There are means for rotating the primary mirror section through a number of angular positions about the aperture being synthesized to obtain a plurality of component images of an object, at least one from each of the positions. There are means for sensing distortion of an incident wavefront and means responsive to distortions of the wavefront for locally adjusting at least one of the optical elements to correct for distortions in the wavefront.

In a preferred embodiment the imaging system may include a secondary mirror intermediate between the detector and the primary mirror. The means for locally adjusting may include a plurality of actuators mounted with one of the optical elements; for example, the actuators may be mounted with the primary mirror or the secondary mirror. There may be means for detecting each of the component images for forming a final image and means for reconstructing the final image of the object from the combined component images. The primary mirror may be a chordal section and it may be a diametrically centered chordal section. The means for detecting may include a CCD array. The means for reconstructing may include means for generating the transform of each component image, means for applying a weighting function to the transform of each component image to reduce the amplitude of the low spatial frequencies, adder means for combining the weighted transforms of each component image to form a composite weighted transform, and means for generating the inverse transform of the composite weighted transform to form the final high-resolution image of the object. The means for generating a transform may include means for generating a Fourier transform and the means for generating an inverse transform may include means for generating an inverse Fourier transform. The secondary mirror may include a single monolithic surface or a plurality of discrete spaced subsections.

DISCLOSURE OF PREFERRED EMBODIMENT

Other objects, features, and advantages will occur to those skilled in the art from the following description of a preferred embodiment and the accompanying drawings, in which.

The first part of the following description, corresponding to FIGS. 1-5, will cover the synthetic aperture aspects of this invention. The adaptive optics aspects will be described later.

Figure 1:
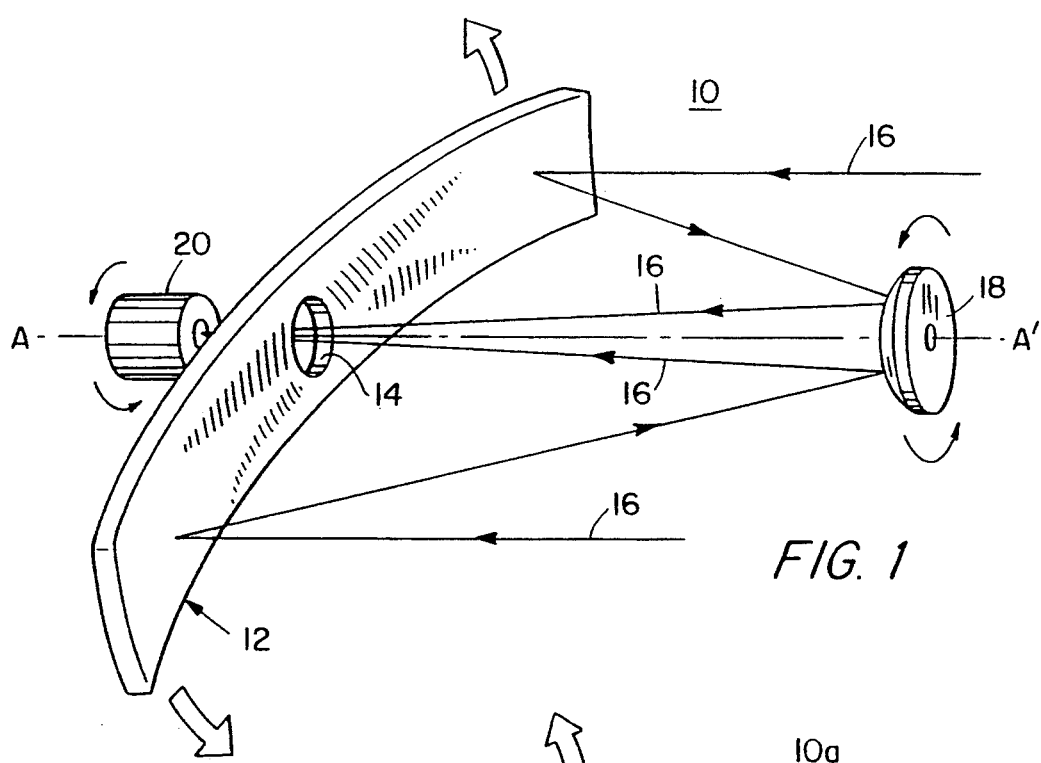
FIG. 1 is a three-dimensional view of a high-resolution synthetic aperture telescope according to this invention.

There is shown in FIG. 1 a high-resolution synthetic aperture telescope 10 including primary mirror 12 which is formed in the shape of a diametrically centered chordal section of the aperture to be synthesized. Primary mirror 12 may be made of beryllium, aluminum, glass, Pyrex or other conventional materials, and coated with protected aluminum, gold if operation is in infrared range, or any other suitable optical coating. An opening 14 is provided centrally of primary mirror 12 so that incoming light depicted by rays 16 reflected from secondary mirror 18 can pass through to detector assembly 20, which may for example be a CCD array. The telescope rotates about optical axis A-A' in order to produce the set of component images, each corresponding to a separate angular orientation, needed to reconstruct the final image.

Figure 2:
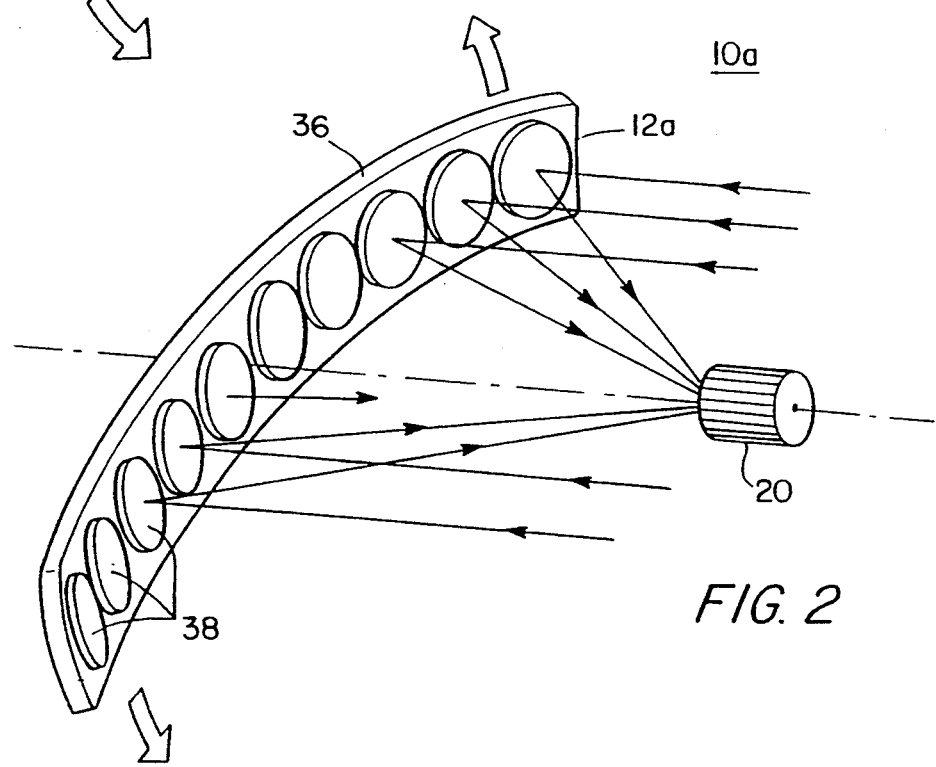
FIG. 2 is a three-dimensional view of a synthetic aperture telescope similar to that shown in FIG. 1 using a plurality of discrete subsections to form the reflecting surface.

Although primary mirror 12 in FIG. 1 is shown as having a monolithic structure, this is not a necessary limitation of the invention. For example, primary mirror 12a, FIG. 2, may include a structural beam 36 made of similar materials as explained with respect to mirror 12 in FIG. 1, but supporting instead of a monolithic surface a plurality of discrete subsections 38, each of which forms a portion of the entire reflecting surface. FIG. 2 also illustrates that a secondary mirror 18 and hole 14 are not required to access detector 20 behind the mirror. In fact, detector 20 can be put at the primary focus in front of mirror 12a.

Figure 3:
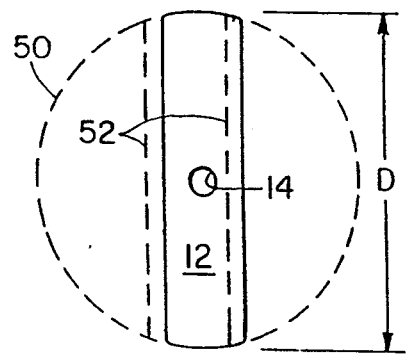
FIG. 3 is a schematic plan view of a chordal segment primary mirror as shown in FIGS. 1 and 2, and an alternative form of a chordal segment superimposed on the aperture to be synthesized.

While the primary mirror 12 in FIGS. 1-2 is shown as a diametrically centered chordal section of the full aperture 50, FIG. 3, to be synthesized, this is not a necessary limitation of the invention as primary mirror 12 may take any form which is compatible with synthetically creating the aperture. For example, mirror 12 need not be diametrically centered but may be off center and may be larger or smaller than depicted in FIG. 3, as illustrated by chordal section 52 shown in phantom.

Figure 4:
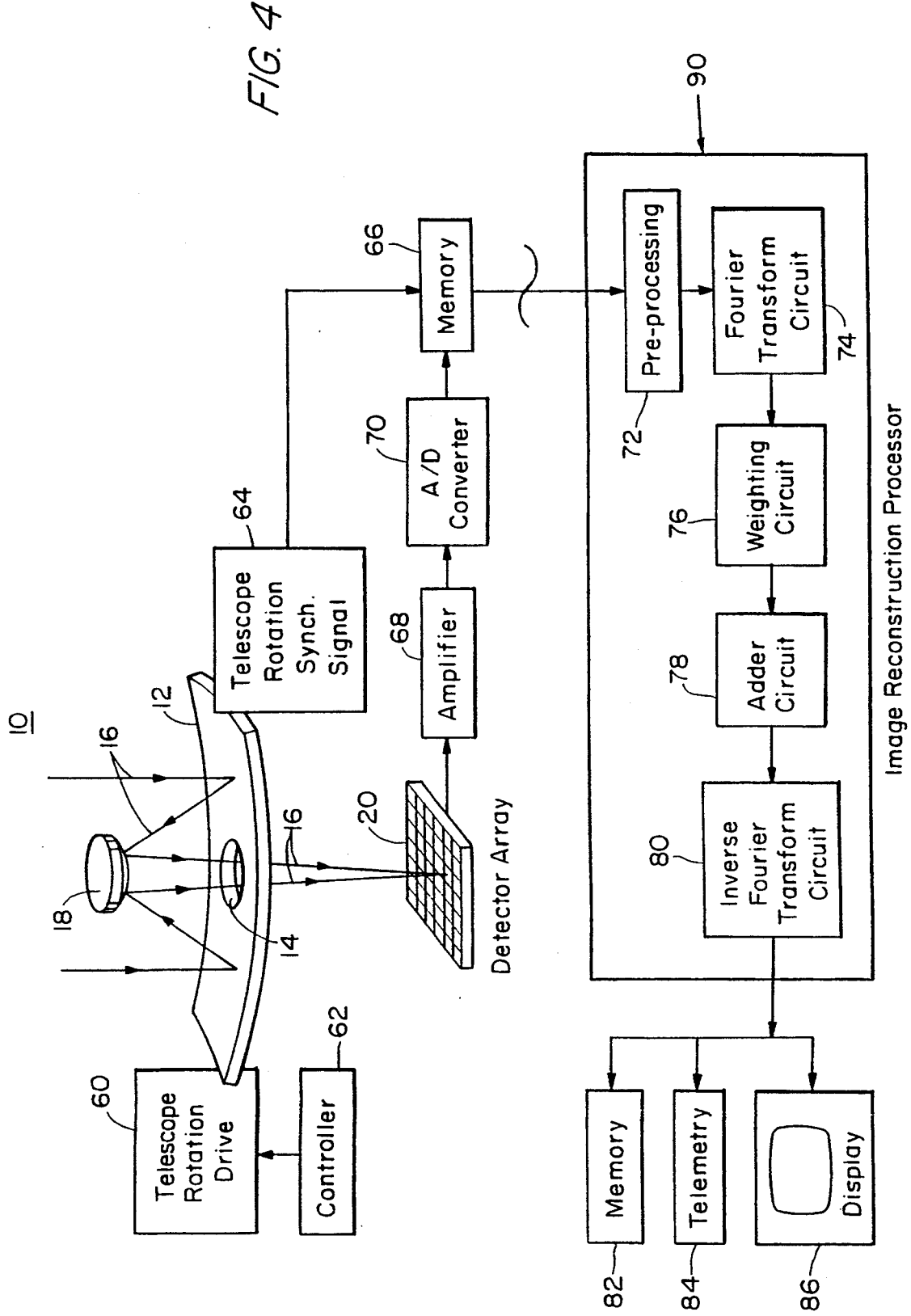
FIG. 4 is a block diagram of a high-resolution synthetic aperture telescope including the drive and image processing systems.

Telescope system 10 is driven by telescope rotation drive 60, FIG. 4, operated by controller 62 to rotate smoothly and continuously or in steps, as desired. The position of mirror 12 is sensed by the telescope rotation synch signal circuit 64 which provides a synch signal to memory 66. Memory 66 also stores the input from detector array 20 which has been passed through amplifier 68 and A/D converter 70. From memory 66 each of the component images is delivered to a preprocessing circuit 72, either directly or through a remote data link. The preprocessing circuit for example corrects for the difference in sensitivity between the individual elements or pixels of the detector array 20. Following this a Fourier transform of the component image is generated in Fourier transform circuit 74. A weighting function is applied in weighting circuit 76 to adjust the low spatial frequency data in each component image, after which each of the component images so weighted are co-added together in adder 78 to form a composite Fourier transform. The inverse Fourier transform is then generated in circuit 80 to provide the final high-resolution image of the object as if produced by the full, diffraction limited aperture being synthesized. The output may then be fed to any desired storage or display device such as memory 82, a telemetric output 84, or a local or remote display 86.

Although Fourier transforms have been used to process the signal in FIG. 4, this is not a necessary limitation of the invention, as other mathematical techniques such as the Maximum Entropy Method can be used to implement the same high-resolution synthetic aperture system.

Figure 5:
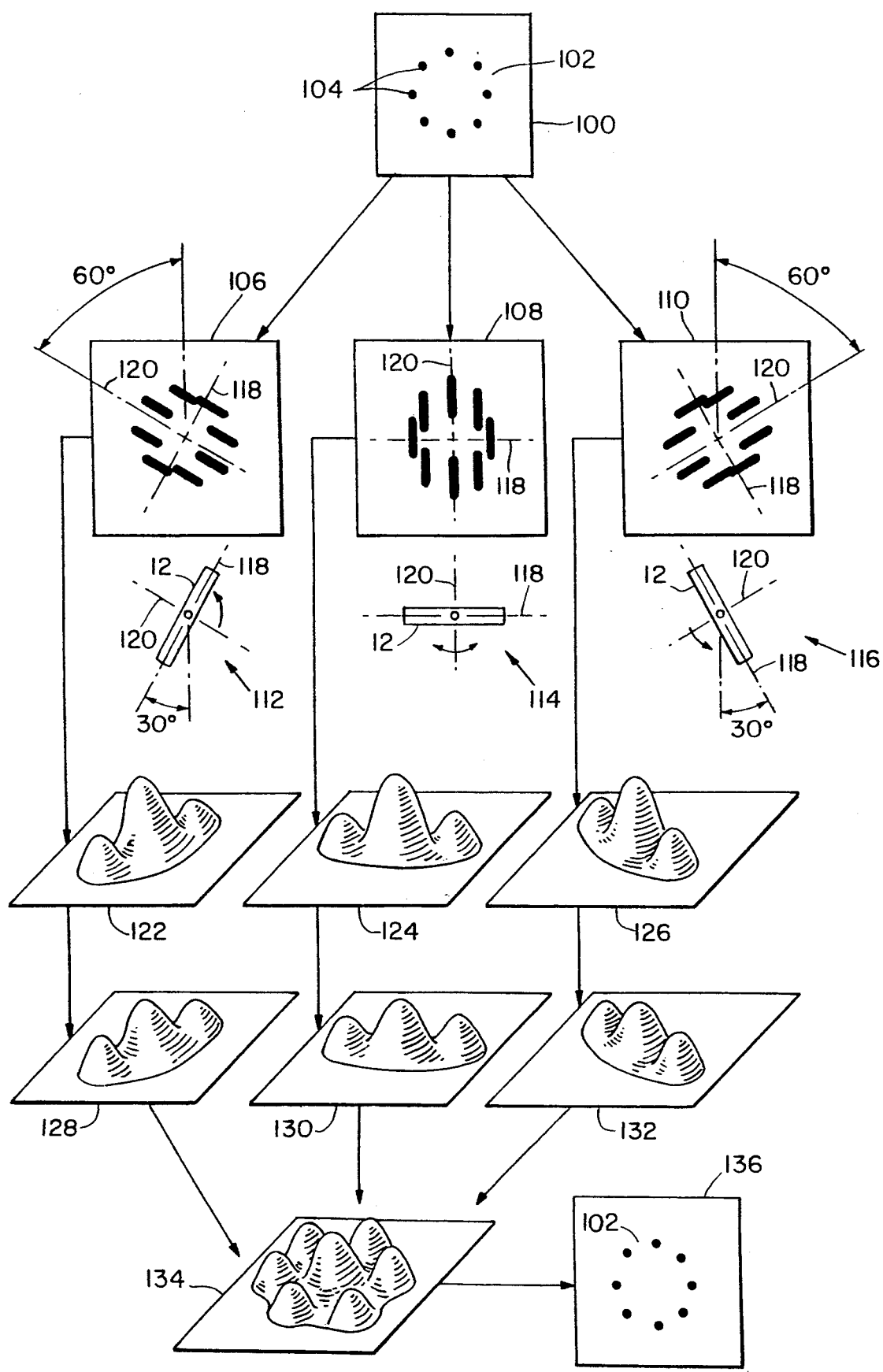
FIG. 5 is a series of graphical illustrations depicting the image processing operations performed by the image reconstruction processor of FIG. 4.

The image reconstruction processor portion 90, which includes Fourier transform circuit 74, weighting circuit 76, adder circuit 78, and inverse Fourier transform circuit 80, provides a series of image reconstruction steps as shown in FIG. 5, where the original object 100 is shown, for purposes of illustration, as a circular locus 102 formed of a plurality of dots 104. Component images 106, 108 and 110 depict the images created by primary mirror 12 at three different rotational positions as shown at 112, 114 and 116, respectively. Three positions are used here only to simplify the illustration; typically more than three would actually be used. Good resolution is obtained along the elongate axis 118 of mirror 12 as depicted in component images 106, 108 and 110, and poor resolution is obtained perpendicular to that along the lateral axis 120. The real part of the Fourier transforms of the component images are depicted at illustrations 122, 124 and 126. The real parts of the Fourier transforms are plots of the amplitudes and orientations of the spatial frequencies in the component image.

In the next operation, weighting circuit 76 multiplies each Fourier transform by a weighting function to reduce the amplitude of the low spatial frequency data, providing the modified Fourier transforms shown in illustrations 128, 130 and 132. The amplitude of the low spatial frequency data must be reduced to prevent oversampling of the central region of the Fourier plane, which would result in image degradation. The weighted Fourier transforms are then co-added in adder circuit 78 to form a single composite Fourier transform shown in illustration 134, after which the inverse Fourier transform is generated by circuit 80 to reproduce the high-resolution image 136 of target 102 as if a full aperture, diffraction limited optical element had been employed. Mirror 12 may be rotated through a number of revolutions to improve the image quality obtained by image reconstruction processor portion 90, in the manner of tomographic synthesis as is well known.

Figure 6:
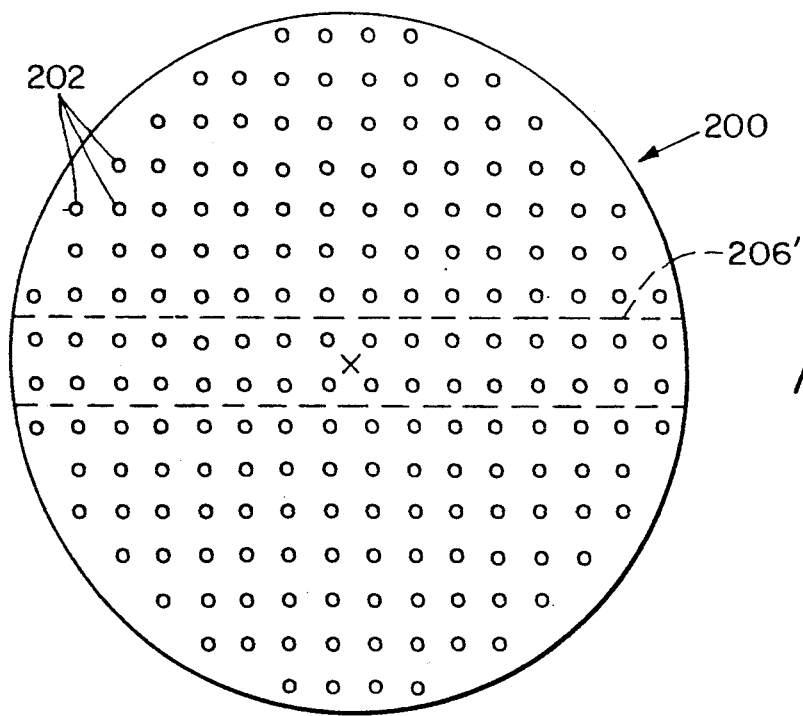
FIG. 6 is a schematic plan view of a conventional full circular aperture mirror.
Figure 7:
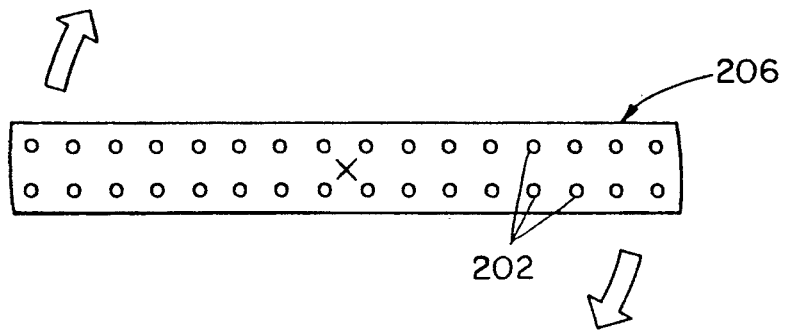
FIG. 7 is a plan view of a chordal section of the mirror of FIG. 6 which can be rotated to synthesize the full aperture of the mirror of FIG. 6.

The economic benefit of applying adaptive optics to this telescope configuration can be seen easily in FIGS. 6 and 7, where a typical 48 inch diameter mirror 200 utilizes approximately two hundred actuators 202 to correct for wavefront distortions due to atmospheric turbulence and mirror deformations. In contrast, a 48 inch long, approximately 3 inch wide chordal section 206, FIG. 7, which can be rotated to synthesize the full aperture of mirror 200, uses only thirty-two actuators 202. Chordal section 206 is actually a central chordal section coincident with section 206' shown in dashed lines in FIG. 6.

Figure 8:
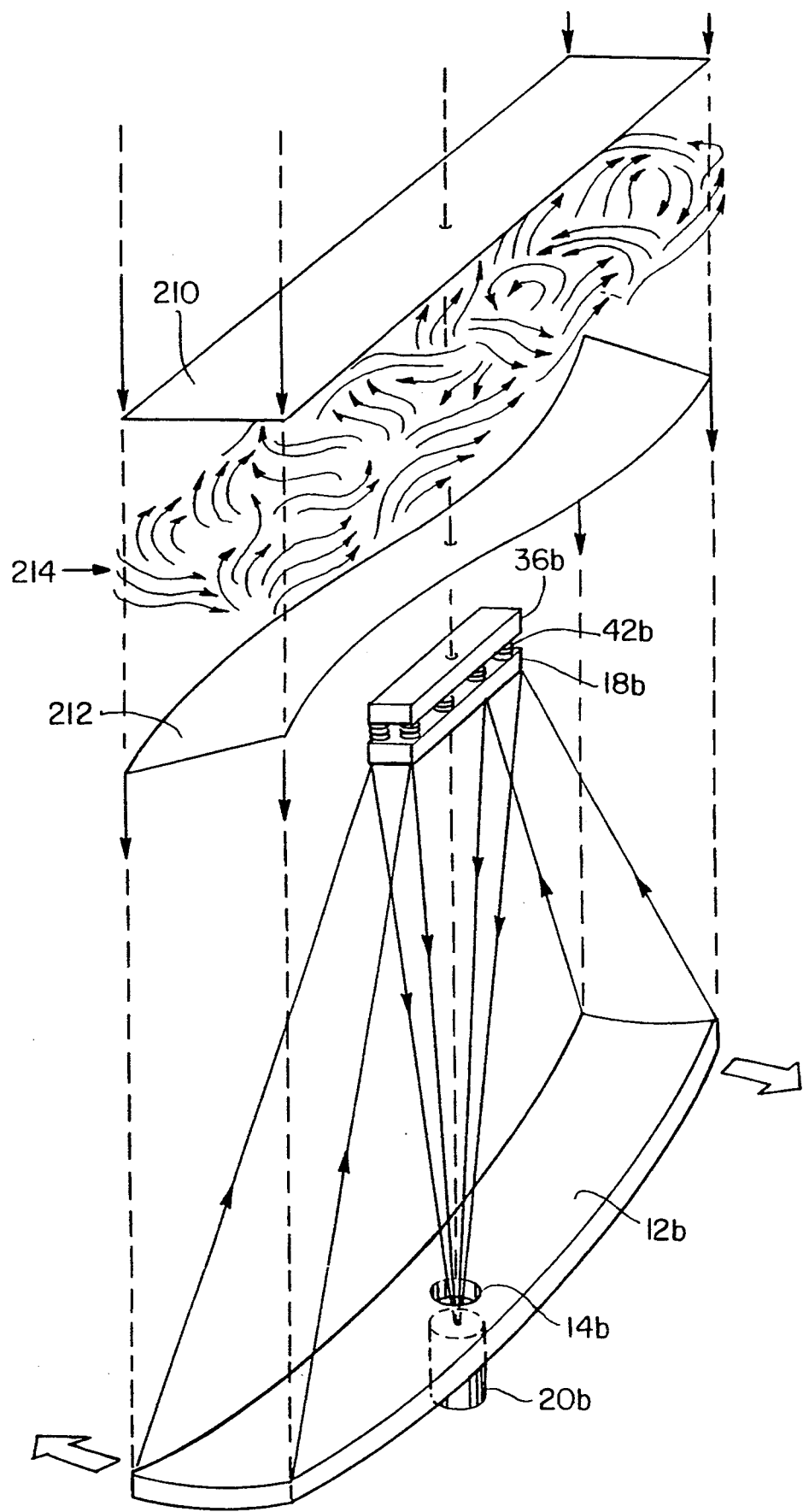
FIG. 8 is a three-dimensional diagram of a high-resolution synthetic aperture adaptive optics system according to this invention.
Figure 9:
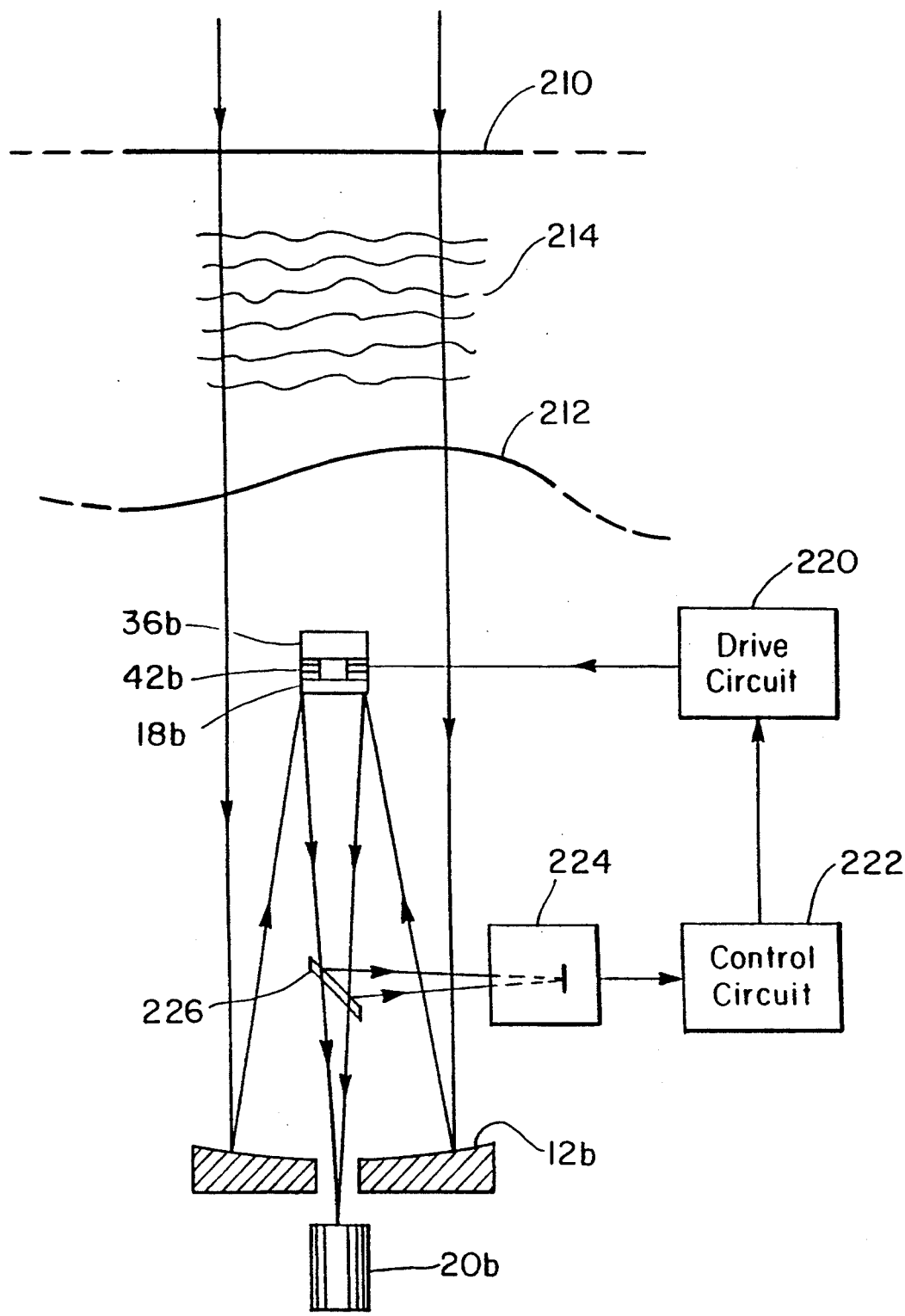
FIG. 9 is a side elevational schematic view of the system of FIG. 8 along with the distortion sensing and feedback control.

Although in FIG. 7 the actuators 202 are shown associated with the primary mirror, this is not a necessary limitation of the invention. For example, secondary mirror 18b, FIG. 8, may be mounted by means of actuators 42b to rigid base plate or beam 36b. Thus when a planar optical wavefront 210 is deformed to form the distorted wavefront 212, either because of the deformation of primary mirror 12b or because of turbulence 214 in the atmosphere, selected ones of actuators 42b are operated to intentionally deform secondary mirror 18b to correct the wavefront distortions so that an undistorted waveform is finally submitted to detector 20b. Actuators 42b are powered by drive circuit 220, FIG. 9, that is operated by control circuit 222 which may, for example, be a microprocessor or a computer which receives inputs from wavefront measurement device 224 that senses the deformation in the wavefront as reflected from beam splitter 226. The wavefront measurement and correction process is performed rapidly and in real time to correct for distortions due to atmospheric turbulence, which typically vary on a time scale of 5 to 10 milliseconds. Although the wavefront correction process has been shown to be accomplished by adjusting the surface of an optical element, this is not a necessary limitation of the invention. As recent advances have shown, wavefront adjustment can be performed within the volume of an element, such as within lithium niobate crystals studied by Asif A. Godil and David M. Bloom of Stanford University.

Figure 10:
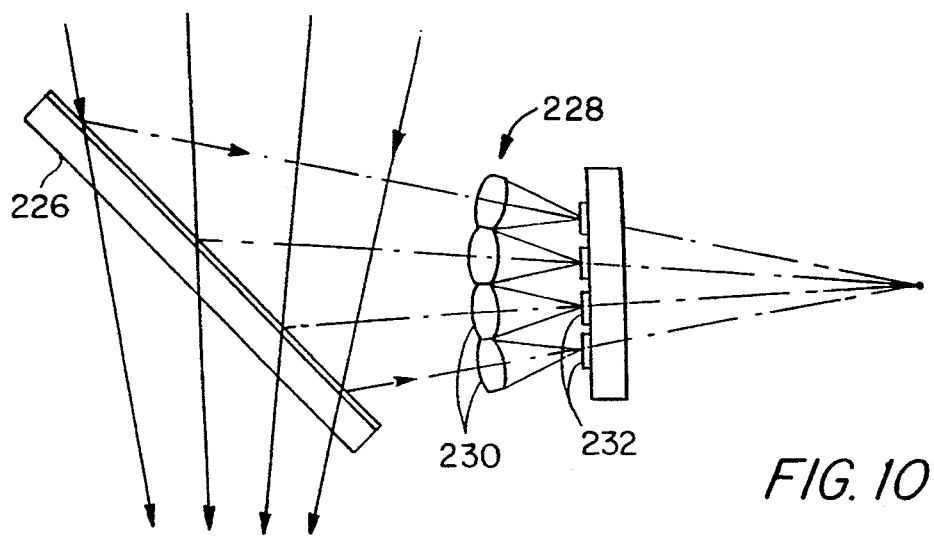
FIG. 10 is a more detailed diagram of one implementation of the wavefront measurement device of FIG. 9.

Wavefront measurement device, 224 may include a lenslet array 228, FIG. 10, formed of a plurality of small lenses 230, each one corresponding to approximately a 3 inch diameter area in the wavefront, which is the approximate size of atmospheric turbulence cells. For a normal undistorted wavefront, the lenslets each focus the incoming radiation at a central point on a detector such as quadrant detectors 232, one of which is associated with each of the lenslets 230. Any curvature or deformation in the originally planar wavefront causes various of the lenslets to focus not at the center of the associated quadrant detector 232, but somewhere displaced from the center. This displacement is then a representation of the tilt of the wavefront in that area. Signals representative of this tilt are delivered to control circuit 222 which encodes the proper electrical signals to enable drive circuit 220 to operate the proper actuators 42b. This type of measurement device is commonly called a Hartmann-Shack wavefront sensor.

Figure 11:
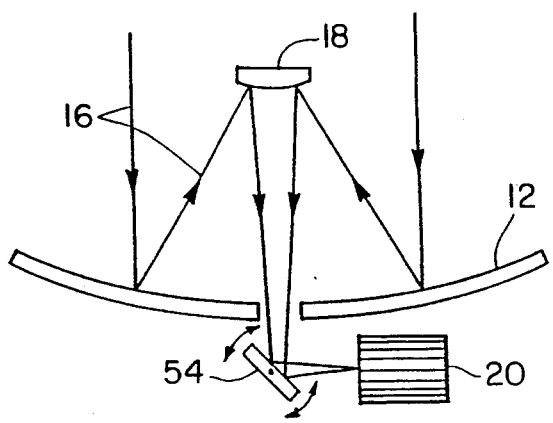
FIG. 11 is a side elevational schematic diagram of the telescope of FIG. 1 including a tip/tilt mirror element.

In order to correct the overall, average slope errors of the wavefront, it is common practice in adaptive optics systems to add a movable, but non-deformable, tip/tilt mirror 54, FIG. 11, to the system. The tip/tilt mirror, by removing the average wavefront slope errors in two dimensions, decreases the length of the required actuator excursions in the actuator array of the deformable element.

Figure 12:
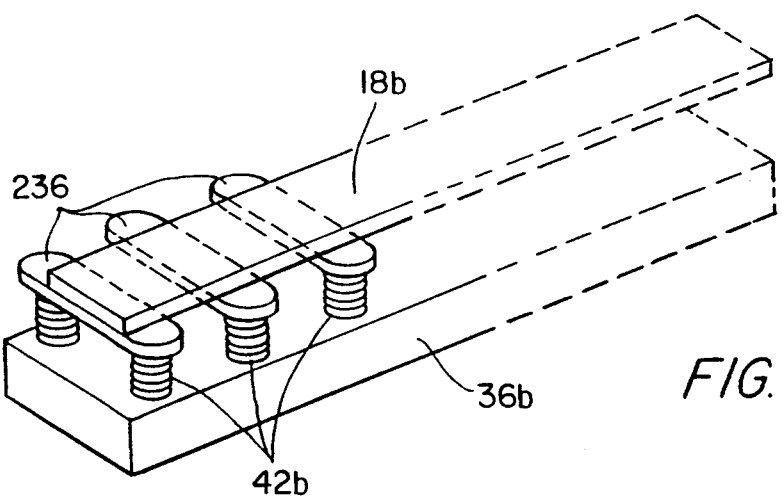
FIG. 12 is a three-dimensional partial view of a deformable secondary mirror having a monolithic surface.

The deformable wavefront correction mirror 18b, FIG. 12, may consist of a monolithic mirror which can be deformed by actuators 42b, acting typically by way of movable arms 236. The stationary ends of the actuators are anchored to rigid baseplate 36b. The actuators may typically be piezoelectric, electrostrictive, magnetostrictive, or of some other electro-mechanical form.

Figure 13:
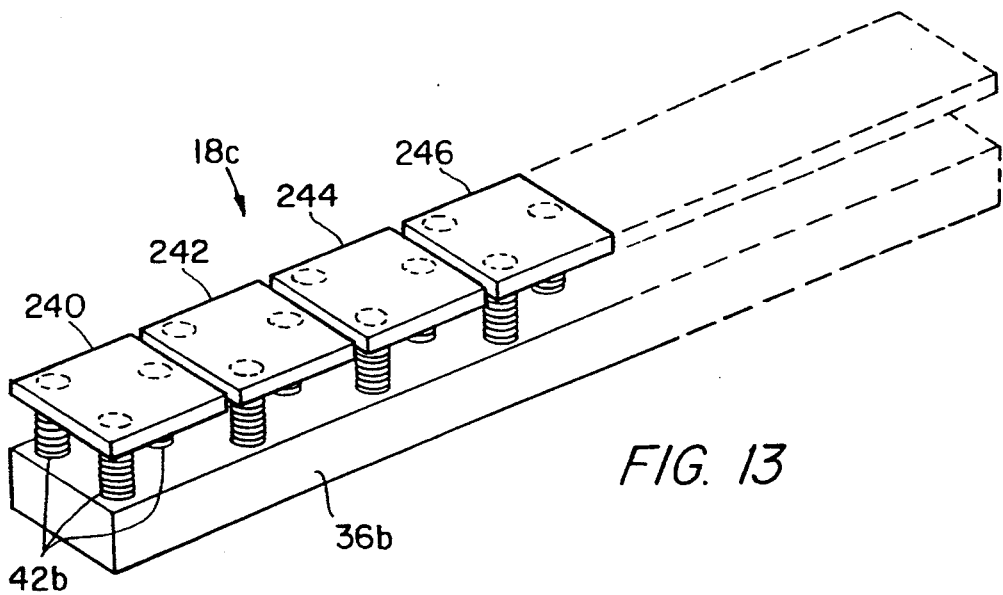
FIG. 13 is a three-dimensional partial view of a portion of an alternative form of a secondary mirror formed of discrete subsections.

Although thus far wavefront correction mirror 18b is depicted as a monolithic mirror, this is not a necessary limitation of the invention, for the mirror 18c, FIG. 13, may instead be formed of a plurality of smaller mirror elements 240, 242, 244, 246, each of which corresponds to an area approximately three inches square in the entrance pupil, and is supported on typically three actuators 42b on rigid baseplate or beam 36b.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A high-resolution synthetic aperture, adaptive optics system for obtaining images of an object using electromagnetic radiation which is received within an aperture to be synthesized, comprising:
   an imaging system having a plurality of optical elements including at least a primary mirror which covers a chordal section of the aperture to be synthesized and a detector for receiving radiation collected by said primary mirror;
   means for rotating said primary mirror section through a number of angular positions about the aperture being synthesized to obtain a plurality of component images of the object, at least one from each of said positions;
   means for sensing distortion of an incident wavefront; and
   means, responsive to distortions of said wavefront, for locally adjusting at least one of said optical elements to correct for distortions in said wavefront.

2. The high resolution, synthetic aperture, adaptive optics system of claim 1 in which said imaging system includes a secondary mirror intermediate said detector and said primary mirror.

3. The high-resolution, synthetic aperture, adaptive optics system of claim 2 in which said means for locally adjusting includes a plurality of actuators mounted with said secondary mirror.

4. The high-resolution, synthetic aperture, adaptive optics system of claim 2 in which said secondary mirror includes a single monolithic surface.

5. The high-resolution, synthetic aperture, adaptive optics system of claim 2 in which said secondary mirror includes a plurality of discrete, spaced, sub-sections.

6. The high-resolution, synthetic aperture, adaptive optics system of claim 1 in which said means for locally adjusting includes a plurality of actuators mounted with one of said optical elements.

7. The high-resolution, synthetic aperture, adaptive optics system of claim 1 further including means for detecting each of the component images for forming a final image.

8. The high-resolution, synthetic aperture, adaptive optics system of claim 1 further including means for reconstructing the final image of the object from the component images.

9. The high-resolution, synthetic aperture, adaptive optics system of claim 8 in which said means for reconstructing includes means for generating the transform of each component image, means for applying a weighting function to the transform of each component image to adjust the amplitude of the low spatial frequencies; adder means for combining the weighted transforms of each component image to form a composite weighted transform of the component images; and means for generating the inverse transform of the composite weighted transform to form the final, high-resolution image of the object.

10. The high-resolution, synthetic aperture, adaptive optics system of claim 9 in which said means for generating a transform includes means for generating a Fourier transform and said means for generating an inverse transform includes means for generating an inverse Fourier transform.

11. The high-resolution, synthetic aperture, adaptive optics system of claim 1 in which said primary mirror covers a diametrically centered chordal section.

12. The high-resolution, synthetic aperture, adaptive optics system of claim 1 in which said means for detecting includes a CCD array.

13. The high-resolution, synthetic aperture, adaptive optics system of claim 1 in which said means for locally adjusting adjusts the surface of at least one of the optical elements.

* * * * *